US005225237A

United States Patent [19]

Magnani

[11] Patent Number: 5,225,237

[45] Date of Patent: Jul. 6, 1993

[54] BUILDING SHEETS OF CEMENT MATERIAL REINFORCED WITH PLASTICS MESH AND GLASS FIBERS

[75] Inventor: Silvio Magnani, Canneto Pavese, Italy

[73] Assignee: Fibronit S.r.l., Casale Monferato, Italy

[21] Appl. No.: 421,187

[22] Filed: Oct. 13, 1989

[30] Foreign Application Priority Data

Oct. 14, 1988 [IT] Italy .............................. 22310 A/88

[51] Int. Cl.[5] ......................... B32B 5/02; B32B 13/00

[52] U.S. Cl. ...................................... 428/227; 52/782; 106/754; 428/234; 428/235; 428/237; 428/241; 428/247; 428/251; 428/255; 428/294; 428/302; 428/303; 428/703

[58] Field of Search ............... 428/228, 232, 237, 241, 428/251, 252, 255, 294, 302, 303, 703; 106/711, 724, 726; 52/408, 409, 662, 782

[56] References Cited

U.S. PATENT DOCUMENTS

| | | | |
|---|---|---|---|
| 3,949,144 | 4/1976 | Duff | 428/414 |
| 4,140,533 | 2/1979 | Ohtomo et al. | 106/50 |
| 4,159,361 | 6/1979 | Schupack | 428/240 |
| 4,617,219 | 10/1986 | Schupack | 428/113 |
| 4,853,269 | 8/1989 | Fukumori | 428/43 |
| 5,030,287 | 7/1991 | Magnani | 106/754 |
| 5,030,502 | 7/1991 | Teare | 428/143 |

FOREIGN PATENT DOCUMENTS

| | | | |
|---|---|---|---|
| 0135374 | 3/1985 | European Pat. Off. . | |
| 0206591 | 12/1986 | European Pat. Off. . | |
| 63-207637 | 8/1988 | Japan | 428/703 |
| 2065742 | 7/1981 | United Kingdom . | |

*Primary Examiner*—George F. Lesmes
*Assistant Examiner*—Christopher Brown
*Attorney, Agent, or Firm*—Birch, Stewart, Kolascch & Birch

[57] ABSTRACT

Building sheets consisting of cement, inert materials and additives, and reinforced with plastics mesh and alkali-resistant glass fibers of short and/or continuous type, including a number of superposed elementary layers consisting of a mixture of cement, inert materials and additives and each comprising as reinforcement material a plastics mesh or glass fibers. The apparatus for preparing the building sheets includes a frame, a conveyor belt, support rollers and a slide surface for the conveyor belt, an inversion roller and a drive roller, a possible feeder for a continuous support web, a series of plastics mesh feeders, a series of feeders for glass fiber originating from bobbins, a series of cement mix metering pumps, a series of cement mix distributors and a series of smoothing devices.

13 Claims, 3 Drawing Sheets

BUILDING SHEETS OF CEMENT MATERIAL REINFORCED WITH PLASTICS MESH AND GLASS FIBERS

FIELD OF THE INVENTION

This invention relates to building sheets of cement material reinforced with plastics mesh and alkali-resistant glass fibers.

PRIOR ART

Building sheets are known consisting of cement, inert materials and additives, and reinforced with plastics mesh. Such sheets are also known with the aforesaid matrix, but reinforced with glass, cellulose, asbestos or plastics fibers.

Again, sheets are known reinforced simultaneously with fibers of different kinds which are simultaneously distributed, mixed together, within the mass to form the article. However the need to use only fibers suitable for a single manufacturing process has made it impossible up to the present time to construct sheets in which the reinforcement material is partly plastics mesh and partly glass fiber.

Each of the known types of building sheets has its own characteristics and limits, which are described hereinafter. Sheets reinforced with plastics mesh have the advantage over asbestos cement sheets of not containing asbestos, which can be dangerous to the health. Compared with cellulose cement sheets they have the advantage of greater resistance to ageing and to moisture.

Compared with all other types they have the advantage of not undergoing "sudden fragile" breakage, because breakage by bending is preceded by considerable visible yielding, and because the resistant load, having reached a maximum value, does not fall suddenly to zero but reduces slowly as the induced deformation progresses. Hereinafter in this description, this breakage characteristic will be defined as "non-sudden non-fragile", whereas the expression "sudden fragile" breakage will be used to indicate that the breakage by bending takes place as the result of small deformations which do not deviate appreciably from a relationship of proportionality with the load.

Non-sudden non-fragile breakage of such sheets is an important characteristic because it makes their installation on building sites less dangerous. However, sheets reinforced with plastics mesh have the serious drawback that when subjected to bending they show an incipient cracking load which is too low, to the point that although such sheets are able to perform their function after they have been correctly installed on buildings, they are unable to resist the accidental overloads to which they are frequently subjected during their handling on site and during their installation.

This means that they have to be handled very carefully, and at consequent high costs. There is also a certain risk of the material undergoing damage during installation, with resultant sealing drawbacks.

Glass fiber-reinforced sheets have the drawback of sudden fragile breakage and of being subject to the phenomenon of brittleness on ageing. Cellulose-reinforced sheets also suffer from the drawback of sudden fragile breakage, and in addition their resistance to ageing and moisture is not very high. Asbestos-reinforced sheets have the advantage of very high mechanical strength and resistance to ageing. However they suffer from the serious drawback that asbestos can be a health danger, and in addition they undergo sudden fragile breakage.

Sheets reinforced with mixed fibers (asbestos-cellulose, asbestos-plastics-cellulose, etc.) in practice have the characteristics of the prevailing fiber, the purpose of the additional fibers being to facilitate the forming process.

SUMMARY OF THE INVENTION

We have now discovered new building sheets of reinforced cement material, which undergo non-sudden, non-fragile breakage and have a high incipient cracking load.

Said sheets are characterised by comprising a number of superposed elementary layers consisting of a mixture of cement, inert materials and additives, plus reinforcement material, some of said layers comprising a plastics mesh as reinforcement material and others of said layers comprising alkali-resistant glass fibers as reinforcement material, with suitable alternation.

The sheets are produced by feeding the constituent materials of the sheet in suitable sequence onto a conveyor belt or onto a support web previously located on the belt. Each forming station for a plastics mesh-reinforced layer feeds the mesh and deposits it on the belt or on the support web, or on the already formed underlying layer, while a device pours the cement mix over the mesh to impregnate it.

Each forming station for a glass fiber-reinforced layer feeds said fibers onto the preceding layer, another device then adding cement mix for impregnation purposes. The sequence of these two operations can be reversed. Known smoothing and finishing operations then follow.

DETAILED DESCRIPTION OF THE INVENTION

The characteristics and advantages of the building sheets according to present invention and of the relative production method will be more apparent from the following detailed description.

Figure 1:
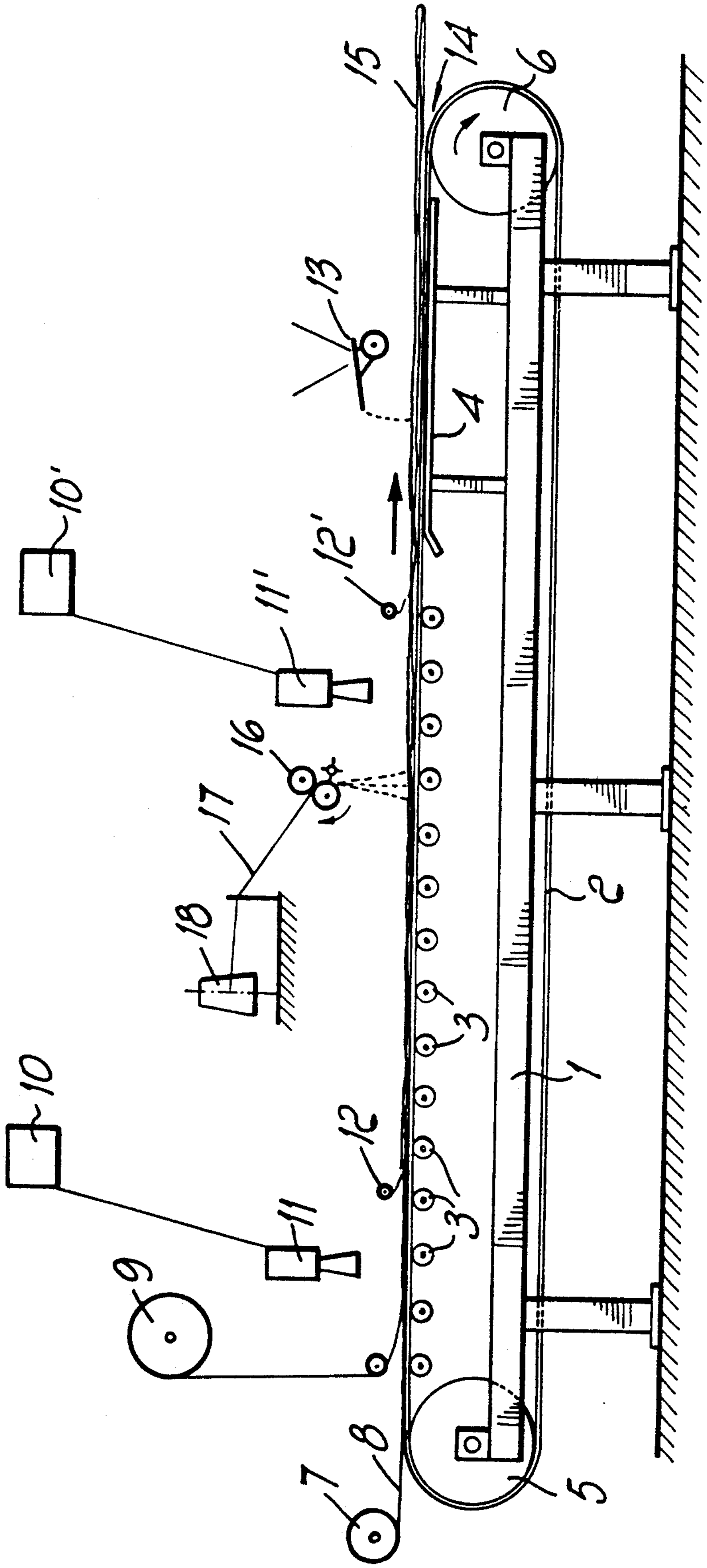
FIG. 1 is a diagrammatic view of the apparatus for producing sheets according to the present invention.

The apparatus used for producing said sheets is shown diagrammatically in FIG. 1.

It can be varied in terms of some of its parts without leaving the field of the invention, an essential requisite of the apparatus being that it is able to form the sheets by superposing in immediately successive steps a plurality of layers of cement material, some reinforced with plastics mesh and others with glass fibers, in a suitable alternating order.

In this respect, we have found that combining plastics mesh with glass fibers in sheets of cement material is only possible by superposing layers comprising plastics mesh and those comprising glass fibers respectively.

For simplicity of representation, in FIG. 1 the forming stations for the individual component layers of the sheet are limited to two in number. In practice however, they would be present in a greater number to form the required succession of layers.

With reference to the numerical symbols of FIG. 1, the apparatus consists of a frame 1, a conveyor belt 2, support rollers 3 and a slide surface 4 for the conveyor belt 2, an inversion roller 5 and a drive roller 6, a possible feeder 7 for a continuous support web 8, a series of plastics mesh feeders 9, a series of feeders 16 for glass fiber 17 originating from bobbins 18, a series of cement mix metering pumps 10 and 10', a series of cement mix distributors 11 and 11', and a series of smoothing devices 12 and 12'.

A support web 8 can be firstly extended on the surface of the conveyor belt 2, which rotates in the direction of the arrow. The deposition of the first layer then commences in accordance with the following sequence: in the first station a plastics mesh originating from the feeder 9 is laid on the belt 2, with the possible interposing of the web 8.

The distributor 11 then applies to the mesh a mix consisting of cement, water, inerts and additives, this mix being fed by the metering pump 10 which draws it from a mixer, not shown in the figure. The deposited material is smoothed by the device 12. In the second station, glass fibers are distributed over the previously obtained surface, the glass fibers being prepared by the distributor 16 which unwinds a continuous thread of glass 17 from the bobbin 18, cuts it to predetermined length to obtain short fibers, and distributes them uniformly over the surface of the sheet under formation.

Said distributor can consist of various elements for dragging and cutting the fiber, disposed side-by-side in the direction transverse to the sheet feed direction and each fed by its own bobbin.

In addition, to provide the best possible distribution of the fibers, the entire distributor can be made to oscillate transversely to the machine feed direction to obtain random fiber distribution.

A distributor 11' then applies onto the thus distributed fibers a mix consisting of cement, water, inerts and additives, this mix being fed by a metering pump 10' which draws it from a mixer, not shown in the figure. The operations effected in the second station terminate with smoothing by a device 12'. Alternatively the thus distributed glass fiber can be submerged into the underlying matrix using suitable mechanical devices without the need for further addition of mix.

The apparatus also comprises a plurality of other stations, some of which are identical to the first described station and others to the second described station, and by which sheets comprising a plurality of overlying layers can be obtained. According to a preferred but not exclusive embodiment, the third and fifth stations are for forming layers reinforced with plastics mesh and are identical to the first described station, whereas the fourth station is for forming a layer reinforced with glass fiber and is identical to the second described station.

Alternatively, external finishing layers of a different kind can be added. When forming is complete, compression treatment can follow, for example by an idle or suitably driven roller, plus finishing treatment by applying a granular layer spread over the surface by the distributor 13.

At the point 14, the sheet 15 and the possible web 8 are removed from the conveyor belt 2 and the sheet 15 is transferred to subsequent operations in accordance with the known art.

As an alternative, if the reinforcement effect of the glass fibers is required only in the longitudinal sheet direction, i.e. in the direction of its manufacture, it is preferable to use continuous glass fibers which by lying within the respective layer as a straight length longitudinally in the direction of formation, utilize the glass fiber characteristics to the maximum extent and allow fiber economy.

Figure 2:
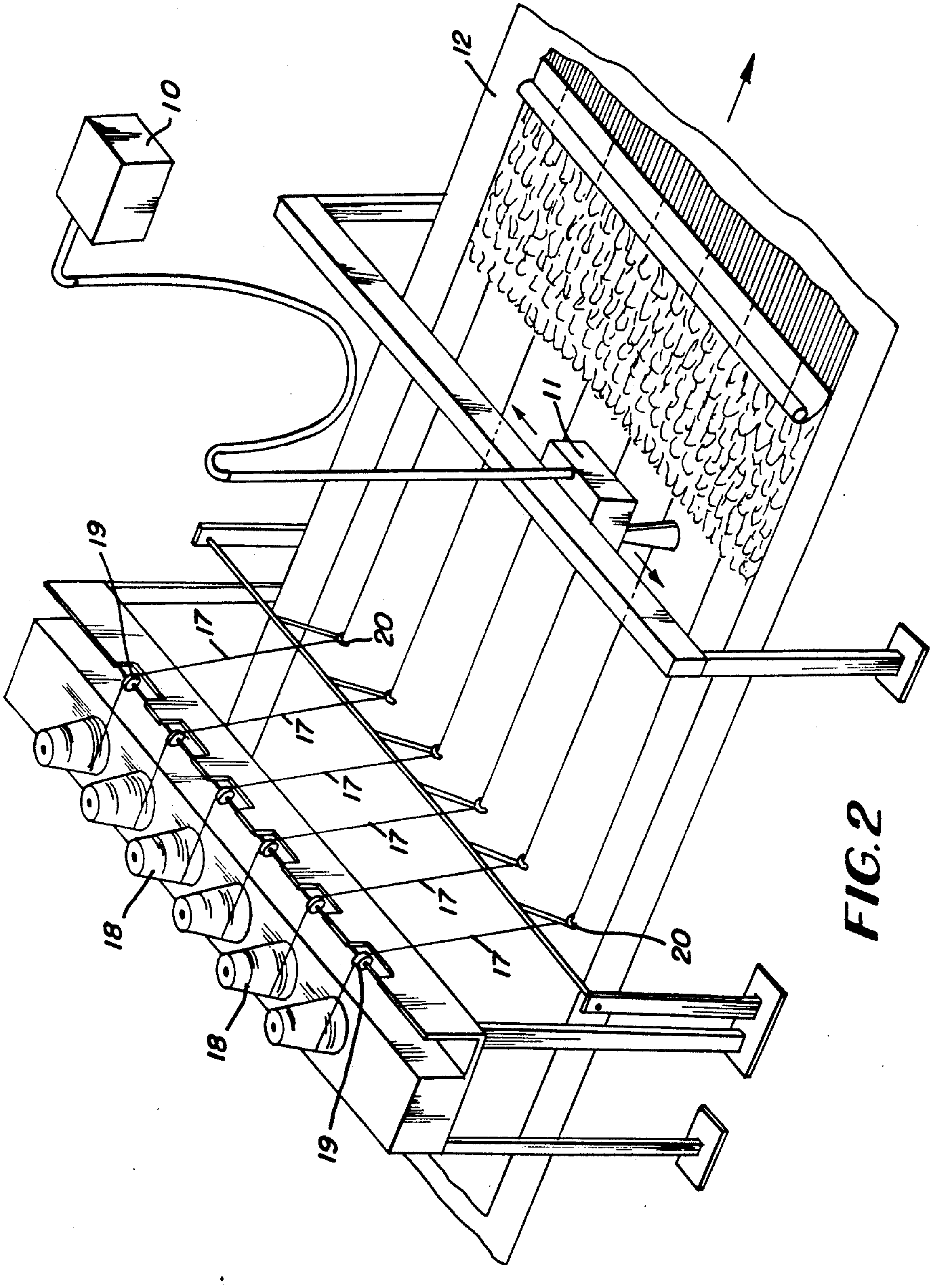
FIG. 2 is a diagrammatic view of a forming station for an alternative embodiment of the present invention.

In such a case, as shown in FIG. 2, a forming station for a cement mix layer reinforced with continuous glass fibers consists of a bank of bobbins 18 of continuous glass thread 17, from which the thread 17 is withdrawn to pass through suitable guide devices 19 and 20 and skim the already formed underlying layers, immediately after which a distributor 11 fed by the metering pump 10 feeds the cement mix onto the uniformly extended glass fibers to impregnate them and cover them. The operations effected in this described station terminate with smoothing by a device 12.

In the station shown in FIG. 2, the position of the guide devices 20 can be adjusted both in height, to give to the glass filaments the best position for proper impregnation, and in the direction transverse to the advancement of the forming sheet. This latter adjustment can be useful when manufacturing sheets which are to be corrugated or profiled, because in such a case the glass fibers can be concentrated in those regions which in the corrugated or profiled sheet correspond to the highest tensile stress when the sheet is subjected to bending. Alternatively, instead of the continuous glass threads, a woven glass thread mesh dimensioned longitudinally and transversely on the basis of the required reinforcement characteristics can be inserted.

As a further alternative for the case in which continuous glass fibers are to be used as reinforcement, it is possible to firstly fix the fibers onto the plastics mesh using a suitable size. In this case the rolls of mesh loaded into the feeders 9 of FIG. 1 can already be attached to the glass fibers, which means that the sheets according to the present invention can be manufactured in an apparatus equipped to manufacture sheets reinforced only with plastics mesh.

The cement mix used for preparing the sheets according to the present invention has the following composition:

- Portland cement (or other hydraulic binder): from 50% to 85% by weight on the dry basis
- Inert materials: from 10% to 50% by weight on the dry basis
- Additives: from 0% to 15% by weight on the dry basis
- Water: from 20% to 60% by weight on the dry basis The inert materials consist preferably of sand, and the additives consist preferably of fluidifiers and dyes. The additives can also have the purpose of retarding plastic fiber degradation by the effect of heat and of thus increasing the flame resistance of the sheet.

Examples of plastics mesh are polypropylene, polyester, acrylic and polyamid mesh.

The plastics mesh is preferably a mesh obtained from fibrillated polypropylene film.

Mesh can also be used consisting of braided fibers, with mesh apertures of various shapes, or of sheets of fibers felted together to form a non-woven fabric, possibly treated for stabilization and fixing. Other fibers can be added to the mesh or sheets, and fixed by a needle operation. The short glass fibers has a length of between 5 and 100 mm and preferably between 20 and 50 mm. The glass fiber used is of the alkaliresistant type. The glass fiber can also be used in the form of mesh of various braids, or in the form of blankets obtained by suitably felting the glass fibers, possibly with the use of a fixing size.

The sheets according to the present invention have a thickness of between 3 and 15 mm, a plastics content of between 18 and 60 g/m$^2$ per mm of thickness, and a glass fiber content of between 10 and 60 g/m$^2$ per mm of thickness. By way of illustration, Table 1 gives data relative to seven examples of building sheet preparation: the Examples 1 and 7 are given for comparison purposes while Examples 2 through 6 relate to the present invention.

Figure 3:
FIG. 3 is a cross-section of a corrugated sheet formed using the apparatus of FIGS. 1 and 2.
Figure 4:
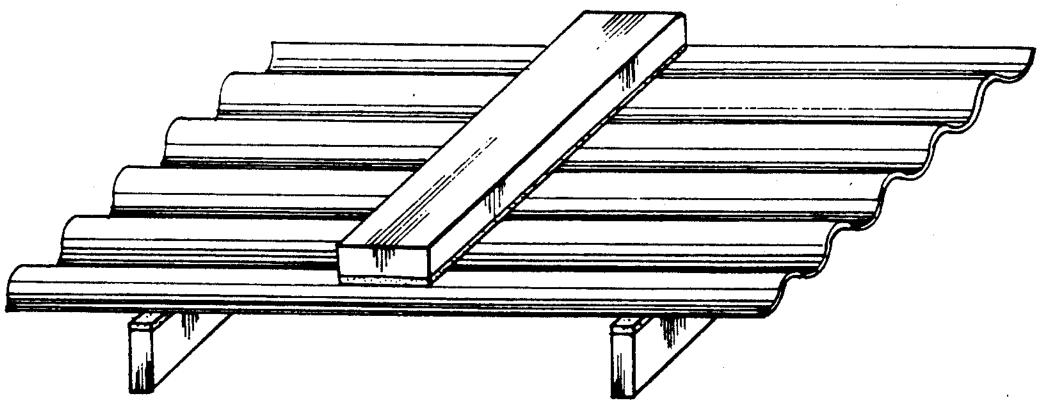
FIG. 4 demonstrates a binding test for a corrugated board.

The cement mix used in these examples had the following composition:

Portland cement 325: 100 parts by weight on the dry basis
Sand with a particle size of 0.2–0.6 mm: 35 parts by weight on the dry basis
Additives (dyes): 2 parts by weight on the dry basis
Water: 30 parts by weight on the dry basis The polypropylene mesh used was of fibrillated polypropylene film type T/R11/12 produced by RETIFLEX S.p.A. (ITALY), and the glass fiber was of the CEMFIL 2 ROVING 2450 TEX type produced by PILKINGTON LTD (GB) cut to a length of 30 mm. The sheets were prepared using the described apparatus. The cross-section through the sheets is shown in FIG. 3. They were of corrugated type with a pitch of 177 mm, a corrugation height of 51 mm and a thickness of 6.5 mm. To determine mechanical characteristics, bending tests were carried out in accordance with the scheme of FIG. 4, applying a load increasing at a rate of about 10 kg/sec.

TABLE I

CEMENT SHEETS REINFORCED WITH POLYPROPYLENE MESH AND GLASS FIBER

| EX. | SHEET THICKNESS mm | POLYPROP. MESH QUANTITY g/m$^2$ | GLASS FIBER QUANTITY g/m$^2$ | INCIPIENT CRACK LOAD kg | ULTIMATE LOAD kg | DEFLECT. AT ULT LOAD mm |
|---|---|---|---|---|---|---|
| 1 (comparison) | 6.5 | 290 | 0 | 180 | 490 | 92 |
| 2 | 6.5 | 290 | 120 | 230 | 530 | 93 |
| 3 | 6.5 | 290 | 240 | 290 | 610 | 95 |
| 4 | 6.5 | 210 | 280 | 320 | 570 | 60 |
| 5 | 6.5 | 2i0 | 220 | 265 | 550 | 60 |
| 6 | 6.5 | 180 | 240 | 285 | 530 | 55 |
| 7 (comparison) | 6.5 | 80 | 300 | 260 | 440 | 32 |

The expression "incipient cracking load" is used to indicate the value of the load which, in a bending test of the sheet, gives an incipient defect of impermeability of the sheet. Considering Example 1 of the table, which relates to a sheet reinforced with only plastics mesh and is given for comparison purposes, it can be seen that the incipient cracking load is fairly low.

Considering the example 7, which relates to a sheet reinforced with a content of polypropylene below the range of the invention, the ultimate load and the deflection at ultimate load are very low.

Considering the examples 2–6, which relate to sheets according to the invention, a decided improvement can be noted both in the incipient cracking load and in the ultimate load, and in addition good values are maintained with regard to the deflection corresponding to the ultimate load. The sheets according to the invention are therefore of non-sudden, non-fragile breakage and have good mechanical strength, with an incipient cracking load under bending conditions which is decidedly higher than that of known sheets reinforced with plastics mesh alone. In addition they have a higher ultimate load.

Finally, it has been found experimentally that upon inducing deflections in the sheets undergoing the bending test which exceed those corresponding to the ultimate resistant load shown in Table 1, the deflections further increase considerably without any appreciable reduction in the resistant load. Compared with sheets of the known art, the sheets according to the invention also have the following advantages: they are not subject to brittling by the effect of ageing, and can be produced with a plastics content such that they fall within the incombustible product class.

I claim:

1. A multilayer building sheet comprising a plurality of superposed elementary layers, each of said plurality of elementary layers including a mixture of cement, inert materials and additives, and a reinforcement material selected from the group consisting of a plastics mesh and alkali-resistant glass fibers, wherein said reinforcement material incorporated into each layer of said plurality of elementary layers is alternately, a plastic mesh and glass fibers and wherein said plastic mesh is a mesh obtained from fibrillated polypropylene film.

2. The multilayer building sheet as claimed in claim 1, consisting of five superposed layers, of which the first, third and fifth are reinforced with plastics mesh and the second and fourth are reinforced with glass fibers.

3. The multilayer building sheet as claimed in claim 1, wherein outer finishing layers are formed with a composition different from the inner layers.

4. The multilayer building sheet as claimed in claim 1, wherein said mixture consists of between 50% and 85% of cement, between 10% and 50% of inert materials and between 0% and 15% of additives, by weight on a dry basis.

5. The multilayer building sheet as claimed in claim 1, wherein said additives are of the type which protect the plastics material from the effects of heat.

6. The multilayer building sheet as claimed in claim 1, wherein additional fibers are added to said plastics mesh, and are fixed thereto by a needle operation.

7. The multilayer building sheet as claimed in claim 1, wherein said glass fibers are of short type having a length between 5 and 100 mm and are distributed randomly.

8. The multilayer building sheet as claimed in claim 7, wherein said glass fibers have a length of between 20 and 50 mm.

9. The multilayer building sheet as claimed in claim 1, wherein said glass fibers are continuous, and are distributed longitudinally of said building sheet.

10. The multilayer building sheet as claimed in claim 1, wherein said glass fibers are woven into a mesh.

11. The multilayer building sheet as claimed in claim 1, wherein the glass fibers are in the form of a blanket obtained by felting said fibers, and selectively fixed to a predetermined size.

12. The multilayer building sheet as claimed in claim 1, having a thickness of between 3 and 15 mm, a plastics material content of between 18 and 60 $g/m^2$ per mm of thickness, and a glass fiber content of between 10 and 6 $g/m^2$ per mm of thickness.

13. The multilayer building sheet as claimed in claim 1, wherein said fibers are concentrated in the regions of major stress.

* * * * *